United States Patent
Foster et al.

(10) Patent No.: US 10,491,415 B1
(45) Date of Patent: Nov. 26, 2019

(54) MAPPING NON-ATTACHED SUBNETWORKS

(71) Applicant: CSC Holdings, LLC, Bethpage, NY (US)

(72) Inventors: Joseph Foster, Wantagh, NY (US); Javier Fernandez, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/937,175

(22) Filed: Mar. 27, 2018

(51) Int. Cl.
| | |
|---|---|
| *H04L 12/28* | (2006.01) |
| *H04L 29/12* | (2006.01) |
| *H04L 12/24* | (2006.01) |
| *H04L 29/06* | (2006.01) |

(52) U.S. Cl.
CPC ...... *H04L 12/2801* (2013.01); *H04L 12/2856* (2013.01); *H04L 41/0213* (2013.01); *H04L 61/2007* (2013.01); *H04L 41/0803* (2013.01); *H04L 65/80* (2013.01)

(58) Field of Classification Search
CPC .............. H04L 12/2801; H04L 12/2856; H04L 41/0213; H04L 61/2007; H04L 41/0803; H04L 65/80
See application file for complete search history.

(56) References Cited

U.S. PATENT DOCUMENTS

| | | | | |
|---|---|---|---|---|
| 2003/0058795 | A1* | 3/2003 | Lansing | H04L 12/2801 370/235 |
| 2005/0259645 | A1* | 11/2005 | Chen | H04L 29/12066 370/389 |
| 2007/0180142 | A1* | 8/2007 | Small | H04L 12/14 709/245 |
| 2014/0185536 | A1* | 7/2014 | Lynn, Jr. | H04L 12/4633 370/329 |

OTHER PUBLICATIONS

*Sandvine Service Delivery Engine PCRF User Guide, Release 7.60*, Sandvine Incorporated ULC, 222 pages, Dec. 26, 2016.
*Service Delivery Engine PCRF User Guide, Release 8.05.02*, Sandvine Incorporated ULC, 246 pages, Feb. 27, 2018.

* cited by examiner

*Primary Examiner* — Hai V Tran
(74) *Attorney, Agent, or Firm* — Sterne, Kessler, Goldstein & Fox P.L.L.C.

(57) ABSTRACT

A method and system to create a mapping of non-attached subnetworks to a Cable Modem Termination System (CMTS) associated with the non-attached subnetwork is provided herein. The method includes transmitting a query to the CMTS for an identification of the non-attached subnetwork and receiving the identification from the CMTS. The method further includes parsing the identification to determine an address of the non-attached subnetwork and mapping an association of the CMTS to the non-attached subnet in a database based on the address.

20 Claims, 6 Drawing Sheets

MAPPING NON-ATTACHED SUBNETWORKS

FIELD OF THE INVENTION

The embodiments presented herein are generally directed towards the mapping of networks and more specifically to the mapping of non-attached subnetworks.

BACKGROUND

Service providers for communications services, such as Internet services, typically monitor usage by client devices subscribing to the service. For example, service providers monitor excessive use of bandwidth or use of the communications service by malicious actors such as hackers. Once such activity is detected, service providers can police or limit the activities of such a client by, for example, directing a policy enforcement point (PEP) to constrain available bandwidth for the client. However, service providers may not have a mapping of which policy enforcement point is coupled to such a client, especially if the client is a non-attached subnetwork. Without this mapping, the service provider will be unable to police the client. Methods and systems are needed to address this deficiency.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates an example system according to an embodiment of the disclosure.

FIG. 2 further illustrates the system in FIG. 1 according to an embodiment of the disclosure.

The embodiments of the present disclosure will be described with reference to the accompanying drawings. The drawing in which an element first appears is typically indicated by the leftmost digit(s) in the corresponding reference number.

DETAILED DESCRIPTION OF THE INVENTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
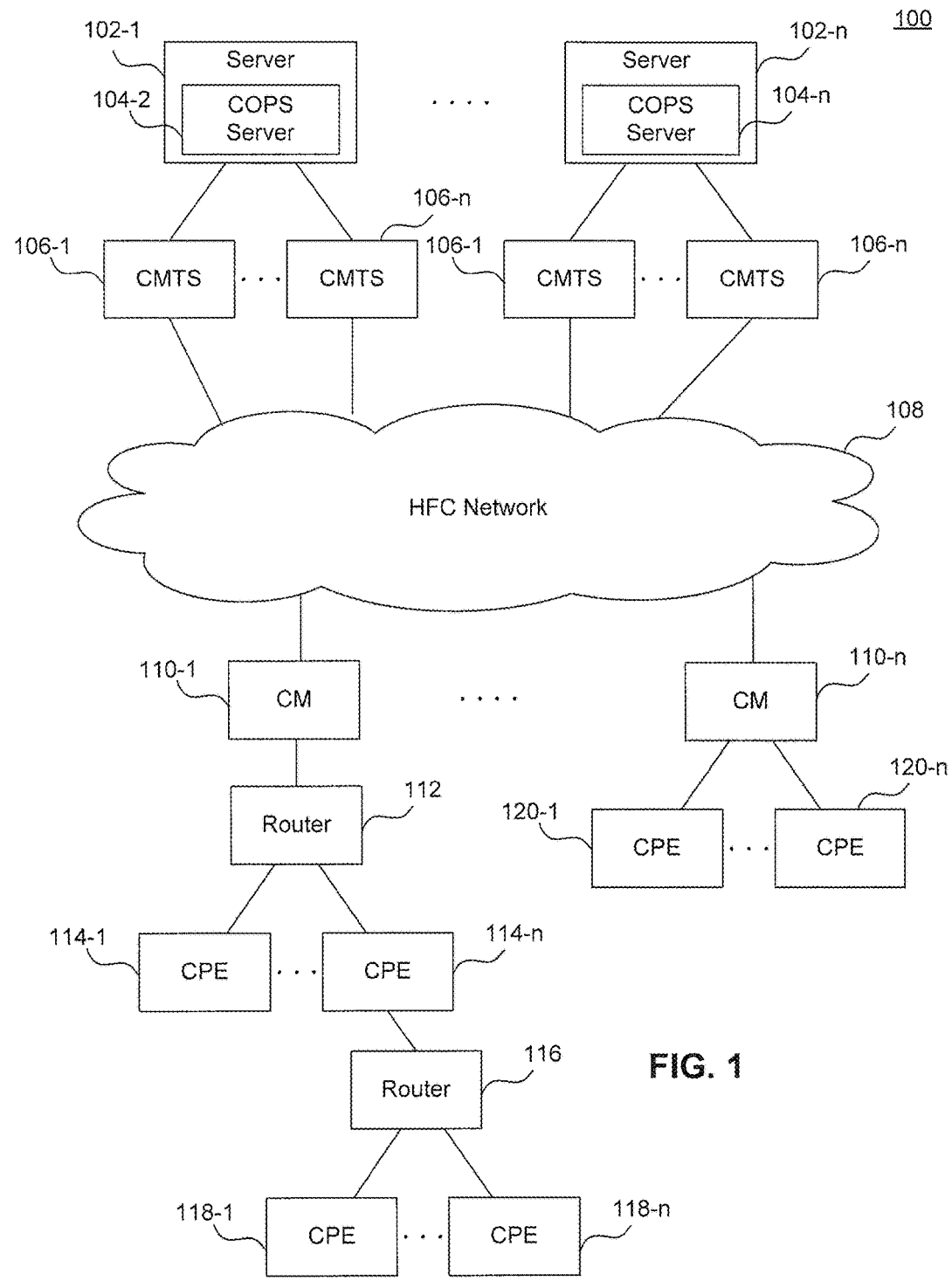

FIG. 1 illustrates an example system 100 according to an embodiment of the disclosure. System 100 may be a Packet Cable Multimedia (PCMM) network that includes servers 102-1 to 102-n, herein servers 102. Servers 102 may include corresponding Common Open Policy Service (COPS) servers from among COPS servers 104-1 to 104-n, herein COPS servers 104. Alternatively, any of the COPS servers 104 can be a standalone server or part of a server farm. Servers 102 can coupled to one or more Cable Modem Termination Systems (CMTSs) 106-1 to 106-n, herein CMTSs 106. Hybrid Fiber Coax (HFC) network 108 is coupled to CMTSs 106. HFC network 108 is also coupled to cable modems (CM) 110-1 to 110-n, herein cable modem 110. Each CM 110 communicates with a single associated CMTS 106 through HFC network 108. In the exemplary embodiment illustrated in FIG. 1, CM 110-1 is coupled to router 112. Router 112 is coupled to customer premise equipment (CPE) 114-1 to 114-n. CPE 114-n is coupled to router 116 Router 116 is coupled to customer premise equipment 118-1 to 118-n. CM 110-n is coupled to CPE 120-1 to 120-n. It is to be appreciated that "n" is an arbitrary number. It is also to be appreciated that the number of servers 102, CMTSs 106, CMs 110, and CPEs 114, 118, and 120 although represented by "n" are not necessarily the same in number. CPEs 114 may be any computational device that can communicate through a wired or wireless medium such as a personal computer, laptop, tablet device, smart phone etc.

COPS servers 104 store COPS policies. COPS includes a protocol that specifies a client/server model for implementing Quality of Service (QoS) in a network. These COPS policies are used by Policy Decision Points (PDP) (such as COPS servers 104), and are enforced on Policy Enforcement Points (PEP) (such as CMTSs 106). In an example, COPS server 104 enforces QoS guidelines by transmitting the QoS guidelines to one or more of the CMTSs 106. The one or more CMTSs 106 in turns enforces those QoS guidelines on each CPE, such as CPE 114-1 to provide an example, via corresponding CMs 110 coupled to the one or more CMTSs 106.

An example of QoS may be a level of use of upstream or downstream bandwidth. For example, if upstream or downstream bandwidth consumption of CPE 120-1 is exceeding a threshold QoS associated with CPE 120-1, a COPS server 104 sends a message to a CMTS 106, that provides service to CPE 120-1, to constrain the use of bandwidth by CPE 120-1. The enforcing of QoS for a particular CPE may be referred to as enforcing a "gate" or a "PCMM gate" or "policing a CPE" herein. However, to enforce the gate, a COPS server 104 needs to know which CMTS 106 is coupled to CPE 120-1. In other words, each COPS server 104 needs a map of which CMTS 106 is coupled to which CPE in order to enforce gates on the CPEs.

In an example, the CPEs 120 may be referred to as an "attached subnetwork," an "attached subnet," or a "directly attached subnet." An attached subnetwork represents one or more devices for which a COPS server 104 can determine a corresponding CMTS 106 that provides service to the one or more devices. For example, a CPE 120 is referred to as an "attached subnetwork" because a server 102 or COPS server 104 can map which CMTS 106 is coupled to the CPE 120 by querying an Interface Management Information Base (IF MIB) file. Because COPS server 104 has a mapping of CMTS 106 to CPE 120, it can monitor and control the QoS of a CPE 120 by sending a message to the corresponding CMTS 106.

In an example, the CPEs 114 and 118 can be referred to as a "non-attached subnetwork," a "non-attached subnet," or a "remote subnet." A non-attached network as referred to herein represents a device that is one or more "routing hops" away from a CMTS 106 and for which a server 102 or COPS server 104 cannot determine the corresponding CMTS by querying the IF MIB file. For example, CPEs 114 are coupled to router 112 and are "one routing hop" away from CMTS 106. CPEs 118 are coupled to router 116 which in turn is coupled to router 112 and hence are "two routing hops" away from a CMTS 106 coupled to them. CPEs 120, which are attached subnetworks, are not more one routing hop away from CMTS 106 since they are directly coupled to CM 110-n. In an example, CPEs that have static Internet Protocol (IP) addresses are also referred to as non-attached subnetworks.

As described above, CPEs 114 and 118 may be referred to as non-attached subnetworks because a COPS server 104 cannot determine which CMTS 106 is coupled to CPEs 114 or 118 by directly querying Interface Management Information Base (IF MIB) files of each CMTS 106 coupled to the COPS server 104. Thus a COPS server 104 may not have "visibility" of a CPE that is more than one routing hop away from CMTSs 106 or has a static IP address. Since a COPS server 104 cannot create a mapping of CMTS 106 to non-attached subnetworks such as CPEs 114 and 118, it therefore cannot enforce a gate or QoS guidelines on CPEs 114 and 118. Thus, if a CPE 114 or 118 is a malicious actor, such as a hacker, that is exceeding its QoS thresholds or QoS parameters, or is using a service provided by a CMTS 106 in an undesirable manner, a COPS server 104 will be unable to determine which CMTS 106 it should communicate with in order to police the aberrant CPE by enforcing a gate. Methods and systems described herein provide a technical solution to this technical problem.

Figure 2:
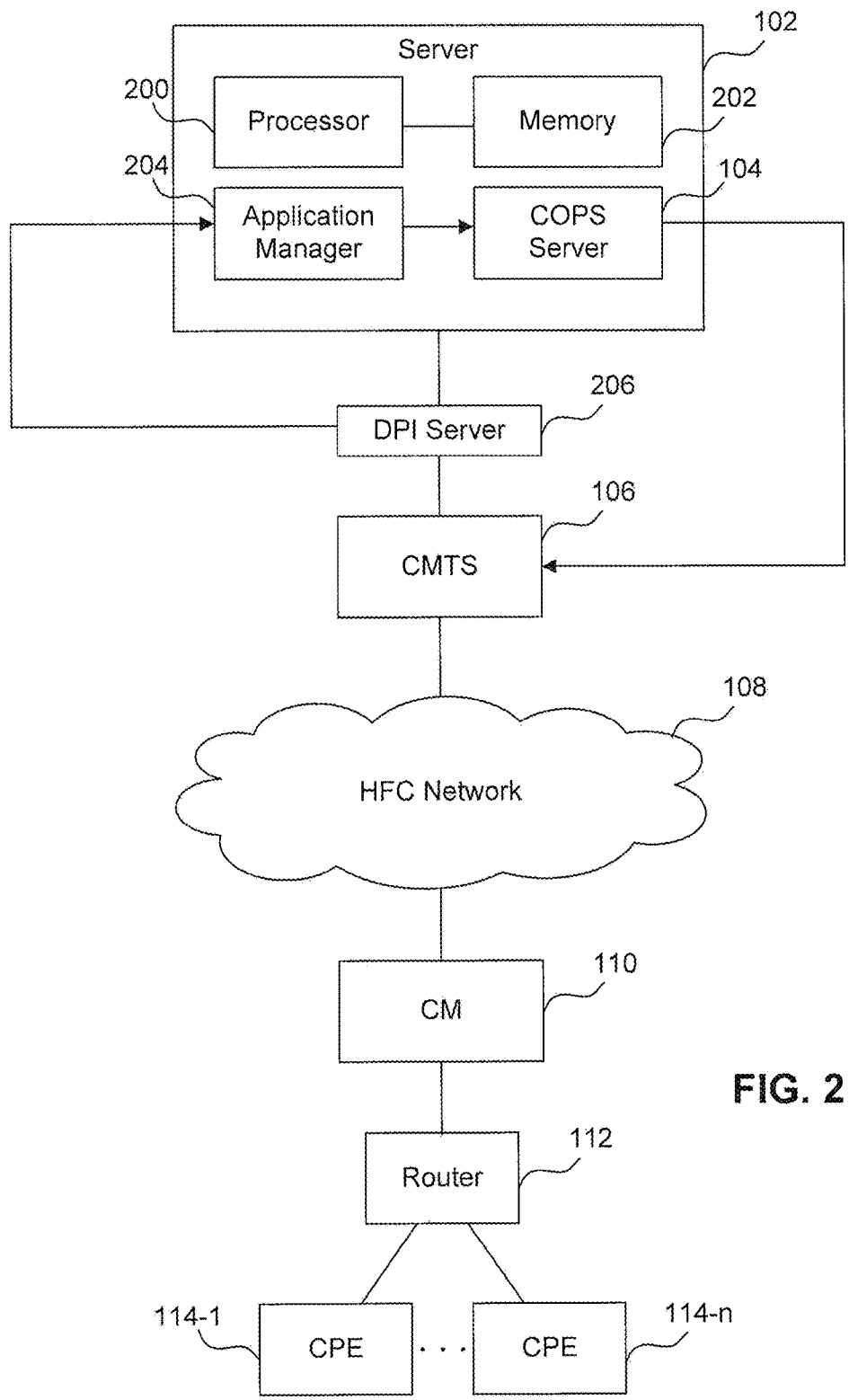

FIG. 2 further illustrates the system 100 according to an embodiment of the disclosure. Server 102 includes a processor 200 coupled to a memory 202. Server 102 also includes an application manager (AM) 204 coupled to COPS server 104. Server 102 is coupled to a Deep Packet Inspection (DPI) server 206. CMTS 106 is coupled to DPI server 206 and to HFC network 108. HFC network 108 is coupled to CM 110. CM 110 is coupled to router 112 which in turn is coupled to CPE 114. As described above, CPE 114 is a non-attached subnetwork since it is one routing hop away from CMTS 106. In an example, application manager 204 and COPS server 104 may run on processor 200 based on instructions stored in memory 202. In another example, COPS server 104 and application manager 204 be independent servers or run on independent servers.

According to an embodiment of the disclosure, COPS server 104 transmits a custom query to CMTS 106 requesting Object Identifications (OIDs) of non-attached subnetworks to map a CMTS 106 to a non-attached subnetwork CPE 114. The query maybe a Simple Network Management Protocol (SNMP) based query. An example of the query is provided below:

Query(nospaces/obfuscated):Snmpwalk-v2c-cpubliccc-mtsl.cmts.cable.net.iso.org.dod.internet.mgmt.mib-2.ip.ip-Forward.ipCidrRouteTable.ipCidrRouteEntry.ipCidr-RouteProto|grep "INTEGER: rip(8)"

In the query above, "cmts1.cmts.cable.net" is the IP address or Fully Qualified Domain Name (FQDN) of the CMTS the query is directed to. "iso.org.dod.internet.mgmt-.mib-2.ip.ipForward.ipCidrRouteTable.ipCidrRouteEntry-.ipCidrRouteProto" is the portion of the query that is Object Identifiers ("OIDs") for non-attached subnetworks.

In response to the query, CMTS 106 provides a response with OIDs of each CPE 114. An example response from the CMTS 106 is provided below:
IP-FORWARD-MIB::
ipCidrRouteProto.1.1.1.0.255.255.255.0.2.2.2.2=INTEGER: rip(8)

COPS server 104 parses the response to determine the IP address, subnetwork mask, and subnetwork gateway for a CPE 114. For example, in the response, "1.1.1.0" is the IP address of a non-attached subnetwork. "255.255.255.0" is the subnetwork mask of the non-attached subnetwork. "2.2.2.2" is a subnetwork gateway address of the non-attached subnetwork. Based on the parsing, the COPS server 104 creates a mapping of a CMTS 106 to a non-attached subnetwork such as CPEs 114 in the format: <cmts-hostname, subnetwork IP address, subnetwork mask IP address, subnetwork gateway IP address>

COPS server 104 may create and store a table in memory 202 that associates CMTS 106 with IP addresses for non-attached subnetworks. Table 1. below illustrates an example mapping of CMTSs 106 to CPEs that are non-attached subnetworks:

TABLE 1

| CMTS | Non-attached subnetwork | IP address for Non-attached subnetwork | Subnetwork mask | Subnetwork gateway |
|---|---|---|---|---|
| CMTS 106-1 | CPE 114-1 | 1.1.2.1 | 255.255.255.0 | 2.2.2.2 |
| CMTS 106-1 | CPE 114-2 | 1.1.2.2 | 255.255.255.0 | 2.2.2.2 |
| ... | ... | ... | ... | ... |
| CMTS 106-1 | CPE-114-n | 1.1.2.n | 255.255.255.0 | 2.2.2.2 |
| ... | ... | ... | ... | ... |
| CMTS 106-x | CPE-x | X.X.X.X | Y.Y.Y.Y | Z.Z.Z.Z |
| ... | ... | ... | ... | ... |

Using the mapping of CMTS to CPEs that are non-attached subnetworks, COPS server 104, upon receiving an IP address of a non-attached subnetwork, can determine the corresponding CMTS and send a message to the CMTS to enforce a gate for the non-attached subnetwork as will be described further below.

According to an embodiment of the disclosure, DPI server 206 monitors one or more parameters associated with flows of packets from CPEs 114 to a destination network (not shown). For example, DPI server 206 may measure a number of packets along with one or more of the source IP address, the destination IP address, the ingress port, and the egress port for each flow of packets from CPEs 114 to the destination network. If the number of packets for a particular flow from a particular CPE 114 exceeds a threshold, DPI server 206 sends the source IP address of the CPE 114 to application manager 204. Application manger 204, in turn, sends the source IP address to COPS server 104. COPS server 104 may use Table 1 to determine the CMTS 106 that is associated with the source IP address. COPS server 104 sends a message to the CMTS 106 to enforce a gate that will limit the number of packets for the particular CPE 114 with the matching source IP address.

Figure 3:
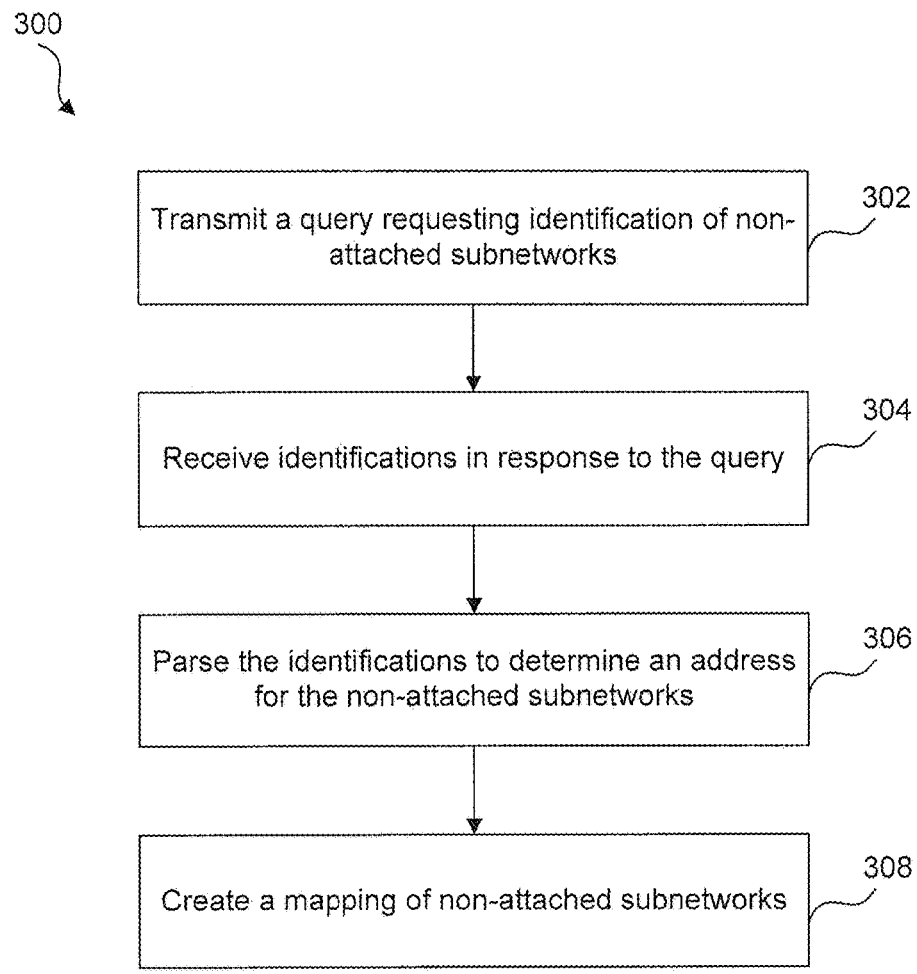
FIG. 3 illustrates an example flowchart according to an embodiment of the disclosure.

FIG. 3 illustrates an example flowchart 300 according to an embodiment of the disclosure. Flowchart 300 will be described with reference to the example operating environment depicted in FIGS. 1-2. However, flowchart 300 is not limited to these embodiments. Note that some steps shown in flowchart 300 do not necessarily have to occur in the order shown.

In step 302, a query requesting identification of non-attached subnetworks is transmitted. For example, COPS server 104 sends a query to CMTS 106 requesting OIDs of non-attached subnetworks such as CPEs 114.

In step 304, identifications are received in response to the query. For example, COPS server 104 receives OIDs from CMTS 106 for CPEs 114.

In step 306, the identifications are parsed to determine respective addresses for each non-attached subnetwork. For example, COPS server 104 parses the OIDs to determine the respective IP addresses for CPEs 114.

In step 308, a mapping is created of non-attached subnetworks. For example, COPS server 104 creates a mapping of non-attached subnetworks such as a CPEs 114 to CMTS 106 and stores it in Table 1.

Figure 4:
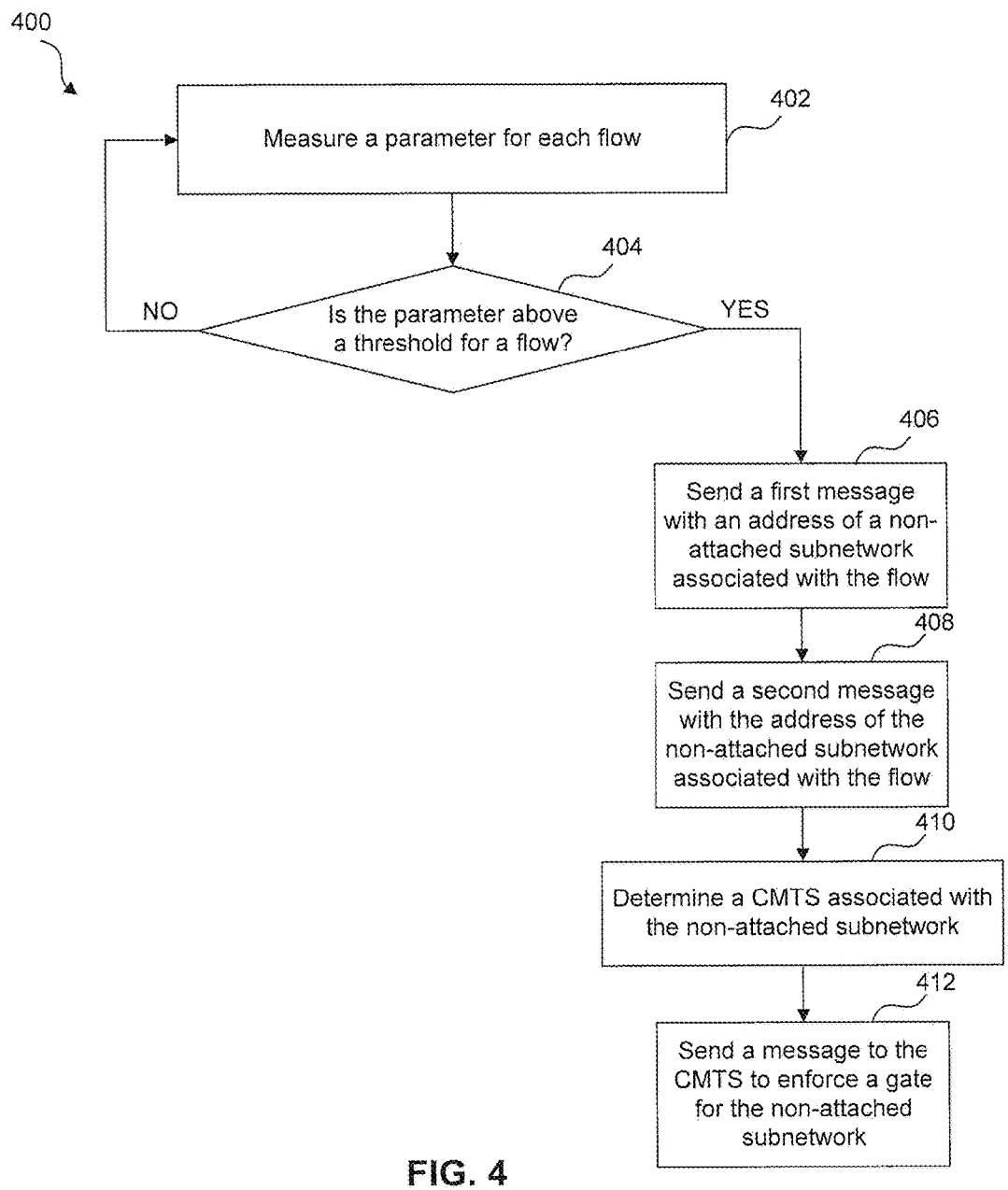
FIG. 4 illustrates an example according to an embodiment of the disclosure.

FIG. 4 illustrates an example flowchart 400 according to an embodiment of the disclosure. Flowchart 400 will be described with reference to the example operating environment depicted in FIGS. 1-2. However, flowchart 400 is not limited to these embodiments. Note that some steps shown in flowchart 400 do not necessarily have to occur in the order shown.

In step 402, a parameter is measured for each flow. For example, DPI server 206 measures a number of upstream or downstream packets for each flow associated with each CPE 114.

In step 404, it is determined whether the parameter is above a threshold for a flow. For example, DPI server 206 determines whether a number of packets for a flow originating from a particular CPE 114 exceeds a threshold. If the parameter is below the threshold, the process returns to step 402. If the parameter exceeds the threshold, then the process proceeds to step 406.

In step 406, a first message is sent with an address of a non-attached subnetwork associated with the flow. For example, DPI server 206 sends a message to application manager 204 with an IP address of a CPE 114 that is associated with the flow.

In step 408, a second message is sent with the address of the non-attached subnetwork associated with the flow. For example, application manager 204, acting as a PDP, sends a message to COPS server 104, which is acting as a PEP, with the IP address of the CPE 114.

In step 410, a CMTS associated with the non-attached subnetwork generating the flow is determined. For example, COPS server 104, using Table 1, determines a CMTS 106 that is associated with a CPE 114 having the IP address received in step 408.

In step 412, a message is sent to enforce a gate on the non-attached subnetwork associated with the flow. For example, COPS server 104, acting as a PDP, sends a message to the CMTS 106, which is acting as a PEP, with the IP address of the CPE 114 associated with the flow to enforce a gate that limits, for example, an upstream or downstream bandwidth available to the CPE 114.

Figure 5:
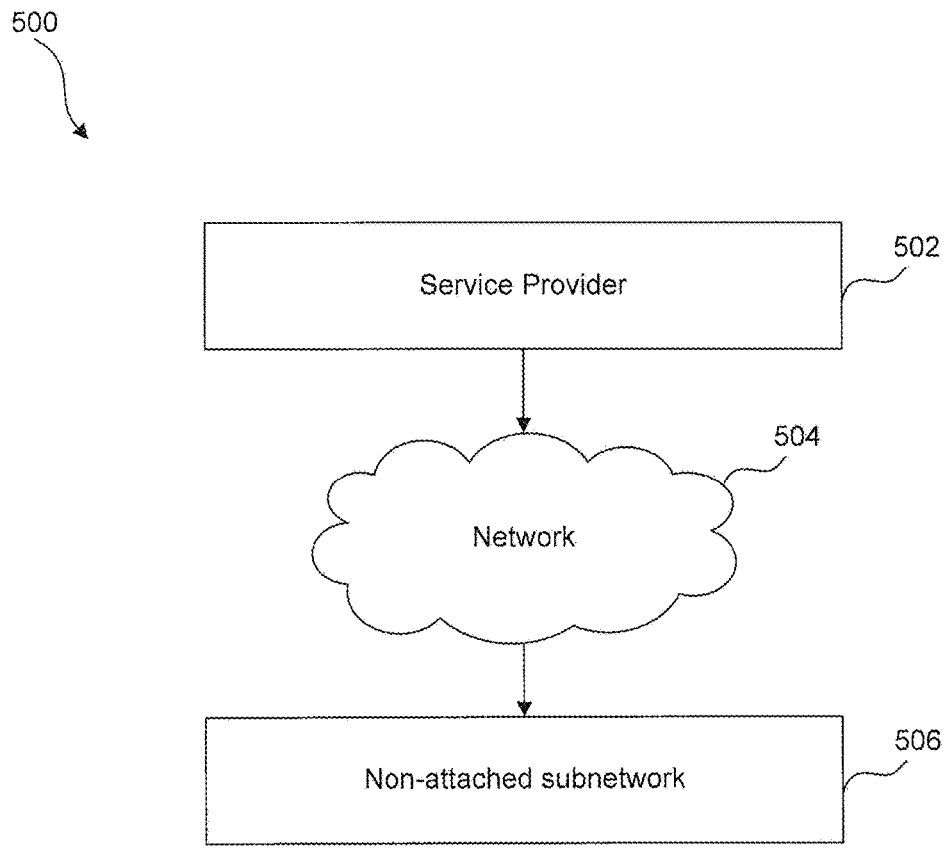
FIG. 5 illustrates an example system according to an embodiment of the disclosure.

FIG. 5 illustrates an example system 500 according to an embodiment of the disclosure. System 500 includes a service provider 502 coupled to a network 504. Network 504 is coupled to one or more devices that comprise non-attached subnetworks 506. Network 504 may be a wired or wireless network. Service provider 502 may provide any type of service including but not limited to wired or wireless services such as Wireless Local Area Network (WLAN), cellular service, Internet service, or cable television service. It is to be appreciated that the type of service or the medium used to deliver the service is a design choice and may be arbitrary. Service provider may comprise, for example, servers 102 and CMTSs 106. Network 504 may be, for example, HFC network 108. Non-attached subnetworks 506 may be, for example, CPEs 114 or CPEs 118.

According to an embodiment of the disclosure service provider 502 provides service to non-attached subnetworks 506. Service provider 502 send a query to determine the IP addresses for non-attached subnetworks 506. Service provider 502 parses a response to the query in order to determine IP addresses of non-attached subnetworks 506. Service provider 502 creates a database with the IP addresses of the non-attached subnetworks. Service provider 502 monitors parameters that indicate usage of a service. When a parameter exceeds a threshold for a particular non-attached subnetwork 506, service provider determines the non-attached subnetwork 506 that exceeds the parameter based on a received IP address and the mapping of non-attached subnetworks 506 in its database. Service provider 502 limits the service provided to that non-attached subnetwork 506 for a particular period of time or until the parameter is below the threshold. In an example, the service provider 502 may determine that a particular non-attached subnetwork 506 is permitted to exceed the parameter and therefore does not limit the service to the particular non-attached subnetwork 506.

Figure 6:
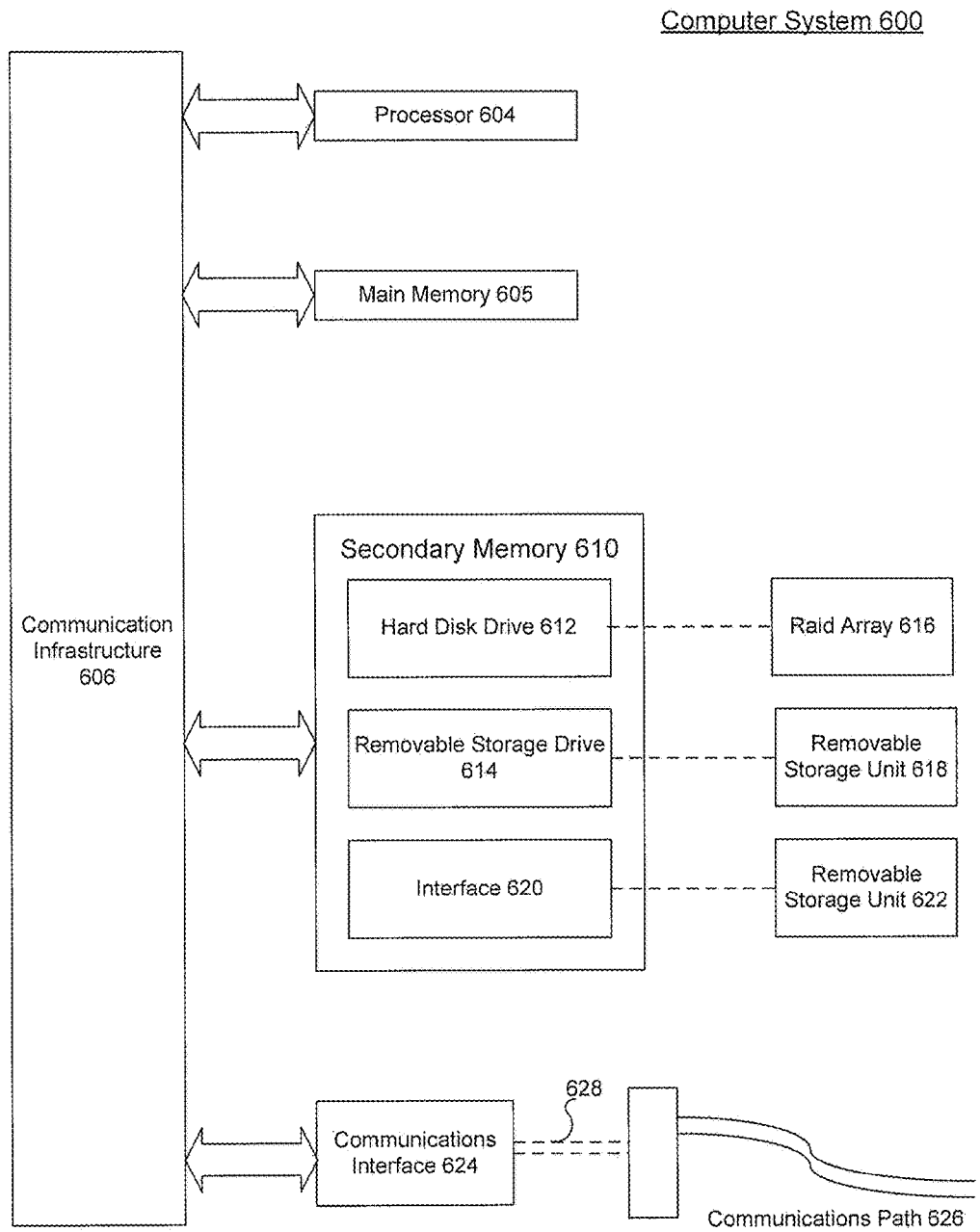
FIG. 6 is a block diagram of an exemplary computer system on which the present invention can be implemented.

The following describes a general-purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 600 is shown in FIG. 6. The computer system 600 includes one or more processors, such as processor 604. Processor 604 can be a special purpose or a general-purpose digital signal processor. Processor 604 may be, for example, processor 200. The processor 604 is connected to a communication infrastructure 606 (for example, a bus or network). Various software implementations are described in terms of this exemplary computer system. After reading this description, it will become apparent to a person skilled in the relevant art how to implement the disclosure using other computer systems and/or computer architectures.

Computer system 600 also includes a main memory 605, preferably random access memory (RAM), and may also include a secondary memory 610. The secondary memory 610 may include, for example, a hard disk drive 612, and/or a RAID array 616, and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618 represents a floppy disk, magnetic tape, optical disk, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software (i.e., instructions) and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, etc., that are coupled to a communications path 626. The communications path 626 can be implemented using wire or cable, fiber optics, a phone line, a cellular phone link, an RF link and other communications links or channels.

The terms "computer program medium" and "computer usable medium" are used herein to generally refer to media such as removable storage drive 614, a hard disk installed in hard disk drive 612, or other hardware type memory. These computer program products are means for providing or storing software (e.g. instructions) to computer system 600.

Computer programs (also called computer control logic) are stored in main memory 605 and/or secondary memory 610. Computer programs may also be received via communications interface 624. Such computer programs, when executed, enable the computer system 600 to implement the present disclosure as discussed herein. In particular, the computer programs, when executed, enable the processor 604 to implement the processes and/or functions of the present disclosure. For example, when executed, the computer programs enable processor 604 to implement part of or all of the steps described in the flowcharts and description herein. Where the disclosure is implemented using software, the software may be stored in a computer program product and loaded into computer system 600 using raid array 616, removable storage drive 614, hard drive 612 or communications interface 624.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

Networks as described herein may include networks that implement one or more communication protocols. Hybrid networks described herein may utilize wired or wireless communication protocols, including for example, the Transmission Control Protocol (TCP), Internet protocol (IP), Data Over Cable Service Interface Specification (DOCSIS), and Wireless Local Area Networks (WLANs) as standardized by the Institute of Electrical and Electronics Engineers (IEEE) in the IEEE 802.11 specification, which is incorporated herein by reference in its entirety. The Internet as referred to herein refers to a network that uses TCP/IP. Exemplary embodiments are not limited to wireless communication networks conforming to the 802.11 specification, and can be used or implemented in one or more other kinds of wireless communication access networks, including (but not limited to), Bluetooth (IEEE 802.15.1 and Bluetooth Special Interest Group), Near-field Communication (NFC) (ISO/IEC 18092), ZigBee (IEEE 802.15.4), Radio-frequency identification (UID), and/or infrared communication, to provide some examples. These various standards and/or protocols are each incorporated by reference in their entirety.

Further, exemplary embodiments are not limited to the above wireless communication networks and can be used or implemented in one or more wireless communication networks conforming to one or more 3rd Generation Partnership Project (3GPP) wireless communication protocols and/ or to one or more non-3GPP wireless communication protocols. For example, the exemplary embodiments can be configured to utilize one or more cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (Wi-MAX) (IEEE 802.16) to provide some examples.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not Abstract section, is intended to be used to interpret the claims. The Abstract section may set forth one or more but not all exemplary embodiments of the present disclosure as contemplated by the inventors, and thus, is not intended to limit the present disclosure and the appended claims in any way.

The embodiments presented herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A method to create a mapping of a non-attached subnetwork to a Cable Modem Termination System (CMTS) associated with the non-attached subnetwork, the method comprising:
    transmitting a query to the CMTS for an identification of the non-attached subnetwork;
    receiving the identification from the CMTS;
    parsing the identification to determine an address of the non-attached subnetwork; and
    associating the CMTS with the non-attached subnetwork based on the address.

2. The method of claim 1, wherein the transmitting comprises transmitting a Simple Network Management Protocol (SNMP) query.

3. The method of claim 1, wherein the receiving comprises: receiving an Object Identification (OID).

4. The method of claim 1, wherein the parsing comprises: parsing the identification to determine an Internet Protocol (IP) address of the non-attached subnetwork.

5. The method of claim 1, further comprising: measuring a number of packets for a flow of packets.

6. The method of claim 5, further comprising: determining whether the number of packets is above a threshold.

7. The method of claim 6, further comprising: sending a message when the number of packets is above the threshold.

8. The method of claim 7, wherein the sending comprises: sending the message including an Internet Protocol (IP) address of the non-attached subnetwork.

9. The method of claim 8, further comprising: determining the CMTS associated with the non-attached subnetwork based on the IP address of the non-attached subnetwork.

10. The method of claim 9, further comprising: sending a message to the CMTS to limit a bandwidth for the non-attached subnetwork.

11. The method of claim 1, wherein the non-attached subnetwork is associated with a static Internet Protocol (IP) address.

12. The method of claim 1, wherein the identification of the non-attached subnetwork cannot be obtained through a query of an Interface Management Information Base (IF MIB) file.

13. The method of claim 1, wherein the non-attached subnetwork is at least one routing hop away from the CMTS.

14. A system to create a mapping of a non-attached subnetwork to a Cable Modem Termination System (CMTS) associated with the non-attached subnetwork, the system comprising:
    a memory; and
    a processor, coupled to the memory, based on instructions stored in the memory, configured to:
        transmit a query to the CMTS for an identification of the non-attached subnetwork;
        receive the identification from the CMTS;
        parse the identification to determine an address of the non-attached subnetwork; and
        associate the CMTS with the non-attached subnetwork based on the address.

15. The system of claim 14, wherein the processor is configured to transmit the query comprising a Simple Network Management Protocol (SNMP) query.

16. The system of claim 14, wherein the processor is configured to parse the identification to determine an Internet Protocol (IP) address of the non-attached subnetwork.

17. The system of claim 14, wherein the processor is further configured to send a message to the CMTS to limit the bandwidth for the non-attached subnetwork based on the address.

18. A non-transitory computer readable medium having instructions thereon that when executed by a computational device cause the computational device to perform steps operations to create a mapping of a non-attached subnetwork to a Cable Modem Termination System (CMTS) associated with the non-attached subnetwork, the operations comprising:
    transmitting a query to the CMTS for an identification of the non-attached subnetwork;
    receiving the identification from the CMTS;
    parsing the identification to determine an address of the non-attached subnetwork; and associating the CMTS with the non-attached subnetwork based on the address.

19. The non-transitory computer readable medium of claim 18, wherein the transmitting the query comprising comprises transmitting a Simple Network Management Protocol (SNMP) query.

20. The non-transitory computer readable medium of claim 18, wherein the receiving the identification comprises receiving an Object Identification (OID).

* * * * *

UNITED STATES PATENT AND TRADEMARK OFFICE
CERTIFICATE OF CORRECTION

PATENT NO. : 10,491,415 B1
APPLICATION NO. : 15/937175
DATED : November 26, 2019
INVENTOR(S) : Foster et al.

Page 1 of 1

It is certified that error appears in the above-identified patent and that said Letters Patent is hereby corrected as shown below:

In the Specification

In Column 7, Line 60, please replace "(UID)," with -- (RFID), --.

In the Claims

In Column 10, Lines 47-48, please replace "steps operations" with -- operations --.

In Column 10, Lines 59-60, please replace "comprising comprises" with -- comprises --.

Signed and Sealed this
Twenty-fourth Day of November, 2020

Andrei Iancu
*Director of the United States Patent and Trademark Office*